(No Model.)
D. WISER.
DRIVE WELL FILTER.
No. 470,274. Patented Mar. 8, 1892.
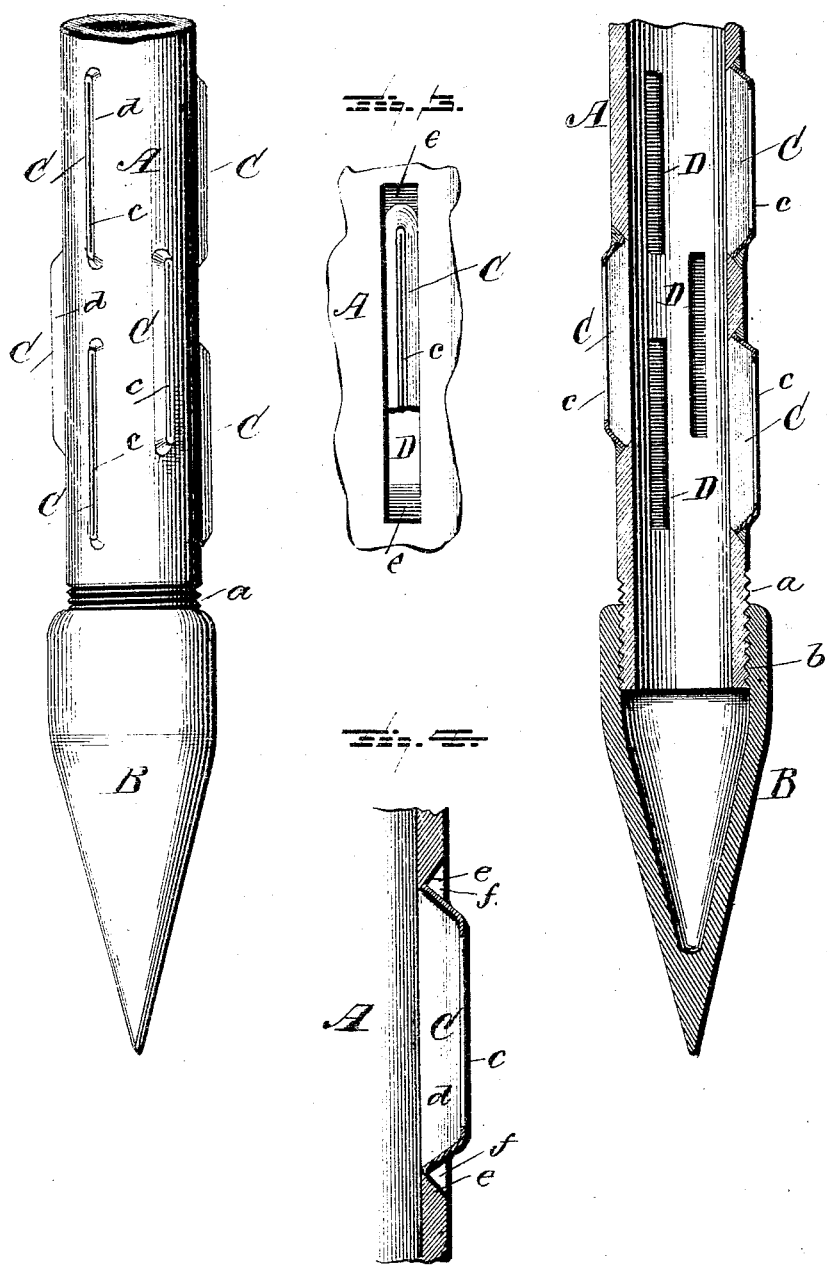

UNITED STATES PATENT OFFICE.

DAVID WISER, OF PLYMOUTH, INDIANA.

DRIVE-WELL FILTER.

SPECIFICATION forming part of Letters Patent No. 470,274, dated March 8, 1892.

Application filed November 14, 1891. Serial No. 411,898. (No model.)

*To all whom it may concern:*

Be it known that I, DAVID WISER, a citizen of the United States, residing at Plymouth, in the county of Marshall and State of Indiana, have invented certain new and useful Improvements in Drive-Well Filters; and I do hereby declare that the following is a full, clear, and exact description of the same, reference being had to the annexed drawings, making a part of this specification, and to the letters of reference marked thereon.

Figure 1 of the drawings represents a side elevation of a drive-well filter constructed in accordance with the present invention; Fig. 2, a sectional elevation thereof; Fig. 3, a detail view showing a portion of the drive-well tube and one of the filters located within the elongated opening formed in said tube; Fig. 4, a detail sectional view through the tube and one of the filters.

The present invention has relation to that class of drive-well tubes provided with a plurality of filters secured over openings formed in said tube; and the invention has for its object to provide a simple and effective means of connecting the filters to the tube and forming elongated openings therein, whereby the filters will be directly over the openings and register therewith, so that the sediment, earth, and other foreign bodies will be prevented from lodging in the filters and closing them while in the act of driving or from any cause, as will be hereinafter more fully described, and subsequently pointed out in the claims.

In the accompanying drawings, A represents a portion of a drive-well tube, provided at its lower end with exterior screw-threads $a$ for connecting thereto the usual point B, which has interior screw-threads $b$ to engage with the screw-threads on the end of the tube.

The tube A is provided with a number of filters C, which extend around the periphery and any distance throughout the length of the tube, which filters may be of cast or sheet metal, and are substantially of the form shown, with the passages or slits $c$ and the vertical side walls $d$. It will be seen that each filter is separate and independent of the other, and therefore if one should break, become worn, or otherwise injured so that it should fail to operate it could be readily replaced with a new one. In addition to this advantage in having the filters separate and independent of each other, their strength is materially increased, and consequently greater durability and a more lasting drive-well tube is the result. The elongated openings D, within which the filters C are located, are fully as large as the filters, both in width and length, the filters being held in place by solder or other well-known means. The openings D being equal in size to the filters a more perfect action of the filters is secured, and are prevented from being clogged or stopped up by the sediment or earth passing through it into the tube while in the act of driving, as no walled space for the accumulation and lodgment of the sediment or earth is left, thus rendering the filters self-cleaning. The elongated openings D have beveled or outwardly-flaring ends $e$, to form receptacles $f$ for the solder in securing the filters C within the openings, the vertical side walls $d$ also being flaring to leave a space between them and the sides of the elongated openings in which to place the solder.

I deem the presence of the filters, together with the elongated slits, as most important, as the two combined form a most efficient double filter, which is not present or obtained where button-shaped holes are provided, having a sheet-metal surrounding-piece. In the latter case the earth will come in direct contact with the filter or gauze as the point is driven. By my construction this does not occur.

Having now fully described my invention, what I claim as new, and desire to secure by Letters Patent, is—

1. A drive-well tube provided with a series of openings and independent filters located over the same and having vertical side walls extending out from the periphery of the tube and having fine vertical slits, substantially as and for the purpose set forth.

2. A drive-well tube having elongated openings with beveled or outwardly-flaring ends for the reception of solder, and filters located within the openings and secured thereto, substantially as and for the purpose described.

3. A drive-well tube having elongated openings with beveled or outwardly-flaring ends, and filters having vertical side walls extending out from the periphery of the tube and
5 secured within the openings, said filters being independent of each other, substantially as and for the purpose set forth.

In testimony that I claim the above I have hereunto subscribed my name in the presence of two witnesses.

DAVID WISER.

Witnesses:
JOHN P. McCORMICK,
DAVID E. SNYDER.